E. E. GOLD.
HOSE COUPLING.
APPLICATION FILED APR. 24, 1914.
1,145,364.
Patented July 6, 1915.
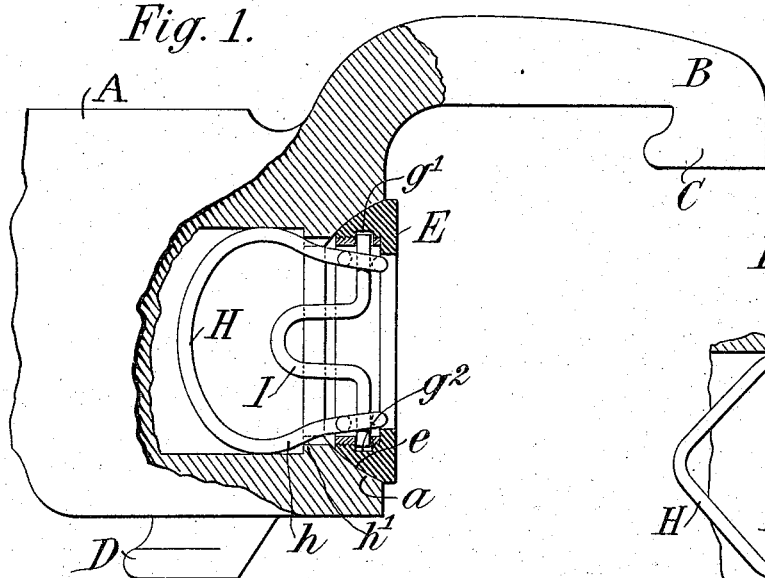
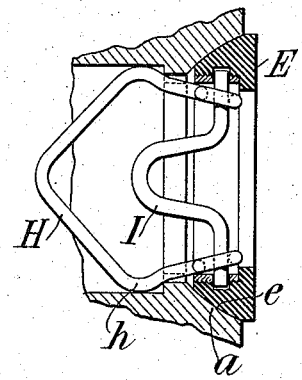
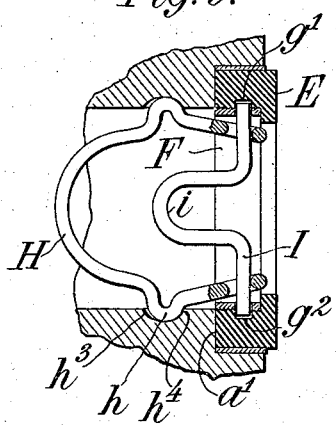
WITNESSES:
INVENTOR:
Edward E. Gold
By Attorneys,
Fraser. Jenks & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

HOSE-COUPLING.

1,145,364.  Specification of Letters Patent.  Patented July 6, 1915.

Application filed April 24, 1914. Serial No. 834,106.

*To all whom it may concern:*

Be it known that I, EDWARD E. GOLD, a citizen of the United States of America, residing in the borough of Manhattan, city, county, and State of New York, have invented certain new and useful Improvements in Hose-Couplings, of which the following is a specification.

My invention relates to couplings such as are employed for coupling the ends of train-pipe hose, and its object is to retain in position the gaskets or seats which are employed to secure a tight joint between the abutting faces of the mating couplers.

The invention will be found particularly useful in connection with rocking or oscillating gaskets of the type of the Balmore and Gold Patent No. 475,738, May 24, 1892, or the Gold Patent No. 550,267, of November 26, 1895. The invention is equally applicable, however, for the purpose of retaining fixed gaskets in position.

The invention consists in the provision of means whereby the gasket-retaining spring is positively held in position and is enabled to at all times perform its function of retaining the gasket in its proper place, notwithstanding the rough usage to which it may be subject.

The invention also relates to the method of assembling the gasket and its retaining devices.

A desirable embodiment of the invention is illustrated in the accompanying drawing, wherein—

Figure 1 is a plan view principally in section of a coupler head having an oscillating gasket equipped with my invention. Fig. 2 is a view illustrating a portion only of the coupler head with a different form of retaining spring. Fig. 3 is a section of a portion of a coupler head equipped with a fixed gasket having a still further form of retaining spring.

My invention is illustrated in connection with a direct port coupler of the familiar Gold type, wherein mating and interlocking coupler heads are employed. I have illustrated only one coupler head and this has a body A from which extends an arm B that overlaps the body of the mating coupler and is provided with a flange C that engages over the flange on the mating coupler corresponding to flange D on the body A. The gasket or seat E may be formed of any desired material; it usually has a body of compressible material such as some asbestos composition.

According to my invention a spring H is provided for the purpose of retaining the gasket in position, which is preferably made of wire. This spring is mounted upon a rod I, and the preferred way of mounting the same is by having its ends looped around the ends of the rod so that the spring may freely contract on the rod when inserted into the coupler. I prefer to arrange this rod diametrically with respect to the gasket, and its ends are located within seats or recesses $g^1$ $g^2$ therein. This rod is provided with a spring portion $i$ which may be compressed and which when it is compressed brings the ends of the rod nearer together. This is for the purpose of enabling the convenient insertion of the rod within the gasket or its removal therefrom.

The form in which the spring is illustrated in the accompanying drawing, to wit, by bending a portion of the rod into a spring loop, I have found to work very satisfactorily. In this form a suitable tool such as a pair of strong pliers may be employed to grip the spring loop $i$ and compress the same so that the ends of the rod may freely be passed within the bore of the gasket and opposite the holes $g^1$ $g^2$, whereupon when the spring loop is released the ends of the said rod will spring into the openings in the gasket and hold the gasket-retaining spring H securely in position.

The body of the spring H extends within the bore of the coupler and is provided with outward bulges so that the spring will compress on insertion, and that when inserted these bulged portions will extend into recesses in the coupler and hold the spring and the gasket in position by contact of the spring with the shoulder forming the front wall of the said recess.

My invention is applicable for use with either an oscillating gasket or a fixed gasket. The oscillating gasket as usually constructed is provided with an outer spherical portion $e$ which fits in a corresponding annular seat $a$ at the end of the coupler. In the fixed gasket the body E is usually rectangular in cross-section on its inner side and is received in a similarly shaped seat $a^1$ in the coupler. Both forms of couplers are usually provided with an inner ring F, and in carrying my invention into effect the rod I enters within this ring and may pass through the same and be seated in the body of the gasket.

My invention is desirable for both forms of the gaskets illustrated by reason of the ease of assembling the gasket and spring and of the certainty with which the gasket is held in position and of the fact that the spring may be employed to fit various makes of couplers. Devices of this character are subjected to very rough usage.

The coupler heads are heavy and awkward to handle and considerable force is required to couple them together, and when the train is in motion they hang near the roadbed and frequently are hit by flying stones. For these and other reasons it is not an uncommon thing for gaskets to be unseated permitting the steam to escape. This is particularly true in the case of oscillating gaskets where it has frequently happened that in coupling the extended arm B would hit the side of the gasket.

The gasket in the form heretofore used has usually been inserted with the spring horizontal as the oscillation of the gasket in assembling is vertical. It will therefore be seen that if in assembling the arm B should hit the side of the gasket near the end of the spring, it would cause the gasket to ride down in its seat, compressing the spring. The ends of these springs in the patented constructions heretofore referred to have been secured directly in the gasket body. The result has been that the end of the spring frequently was forced out of its seat and rested upon the wall of the gasket and in the longitudinal strain involved in a second coupling was forced out of the gasket, and no retaining device at all was then in use. My invention, it will be seen, overcomes this and it further enables the spring to be inserted in any manner without regard to direction of oscillation of the gasket.

Various forms of spring may be employed as desired. In Fig. 1 a spring somewhat of a U-shape is illustrated. Here the bulged portion $h$ is illustrated as engaging in an enlarged part of the bore of the coupler forming shoulders $h^1$. In Fig. 2 the bulge $h$ is illustrated as being formed in a spring of somewhat V-shape. In Fig. 3 the bulge $h$ is somewhat more pronounced and is expanded into a groove $h^3$, forming shoulders $h^4$ which retain the spring in position.

The method of assembling the gasket and its retaining spring which are described in connection with the description of the parts, may be performed by hand or by suitable machinery, as desired.

The life of the gasket body is not very great and according to my invention the spring and its retaining rod may be easily removed from the gasket and inserted in a new gasket and the method of doing this will be the same as that by which the parts were assembled, to wit, by compressing the spring loop in the rod it may easily be withdrawn from the gasket.

I have illustrated the most advantageous method now known to me of constructing the said invention, but I do not intend to be understood as limiting the said invention to the particular construction of the parts so illustrated, as the spring rod may be differently constructed and the retaining spring may be differently constructed or supported on the said rod. These and other modifications within the appended claims are within the limits of my invention.

I claim as my invention:—

1. In a hose coupler having locking devices, and a spherical recess receiving an annular gasket having universal motion, means for retaining said gasket in place comprising a separate rod having a spring portion adapted to be compressed to permit the insertion of said rod in seats in said gasket, or its withdrawal therefrom, said spring normally tending to hold said rod in position in said gasket, and said rod when in position extending substantially diametrically of the bore of said coupler, a spring mounted on said rod and extending in the bore of said coupler and engaging behind a shoulder in said bore.

2. In a hose coupler having locking devices, and a spherical recess receiving an annular gasket having universal motion, means for retaining said gasket in place comprising a rod having a spring portion adapted to be compressed to permit the insertion of said rod in seats in said gasket, or its withdrawal therefrom, said spring normally tending to hold said rod in position in the gasket, and said rod extending across said bore when in position, a wire spring with its ends bent around said rod so as to slide thereon and with its body adapted to extend into the bore of the coupler, said body having outwardly bulged portions, said wire spring adapted to be compressed on its insertion into a coupler and a shoulder in the bore of said coupler behind which said spring may engage.

3. Retaining devices for a hose coupler gasket comprising a rod having a spring portion and extending across the bore of the coupler and having its ends anchored in the opposite walls of the gasket, and a spring carried thereby and adapted to extend in the coupler and to engage behind opposite walls of a shoulder in the bore thereof.

4. Retaining devices for a hose coupler gasket comprising a rod having an integral depending spring loop, and adapted upon compression of said spring to be shortened so as to permit the insertion of said rod in seats in said gasket or its withdrawal therefrom, said rod extending substantially diametrically of the bore of said gasket when in position and said spring loop normally tending to hold said rod in place, and a retaining spring carried by said rod and adapted to extend into a bore of a coupler and engage behind a shoulder in said bore.

5. Retaining devices for a hose coupler gasket comprising a rod having an integral depending spring loop and adapted upon compression of said spring to be shortened so as to permit the insertion of said rod in seats in said gasket or its withdrawal therefrom, and said spring loop normally tending to hold said rod in place, and a separate wire retaining spring having its end bent around the ends of said rod so as to slide thereon and having a body provided with outwardly extending bulges adapted to extend into a coupler bore and engage behind a shoulder therein.

6. A hose coupler gasket and retaining devices therefor comprising a rod having a spring portion which is adapted to be compressed to enter the rod in seats therefor in the gasket, a separate spring having its ends connected to said rod and having a body provided with outwardly bulged portions and adapted to extend into a coupler.

7. A hose coupler gasket and retaining devices therefor comprising a rod having a spring loop and having its ends seated in said gasket, a separate wire spring having both its ends bent around said rod near its ends and having its body adapted to extend into a coupler bore, and having outward bulges in each side of said body adapted to engage into an enlarged part of said bore.

8. A gasket, a rod extending diametrically thereof and having its ends secured to the gasket, said rod having an integral spring portion, and a separate retaining spring mounted on said rod.

9. A gasket, a rod extending diametrically thereof and having its ends secured to the gasket, a rod having a spring loop formed therein, and a separate retaining spring mounted on said rod.

10. The method of assembling a gasket and a retainer therefor which consists in providing a gasket with oppositely disposed recesses, in looping a spring over a rod having a spring portion, in compressing the spring portion of said rod and inserting the ends thereof into said recess.

11. The method of assembling a gasket and a retainer therefor which consists in providing a gasket with oppositely disposed recesses, in forming a depending spring loop in a rod in looping the ends of a spring over the ends of said rod and in compressing the said spring loop and inserting the ends of the rod in said recesses.

In witness whereof, I have hereunto signed my name in the presence of two subscribing witnesses.

EDWARD E. GOLD

Witnesses:
CHRISTOPHER A. MORAN,
F. W. DEARBORN.